United States Patent
Velázquez López et al.

(10) Patent No.: US 8,666,715 B2
(45) Date of Patent: Mar. 4, 2014

(54) METHOD AND SYSTEM FOR A QUICK CALCULATION OF AERODYNAMIC FORCES ON AN AIRCRAFT IN TRANSONIC CONDITIONS

(75) Inventors: Angel Gerardo Velázquez López, Madrid (ES); Diego Alonso Fernández, Madrid (ES); José Manuel Vega de Prada, Madrid (ES); Luis Santiago Lorente Manzanares, Madrid (ES); Valentin De Pablo Fouce, Madrid (ES)

(73) Assignees: Airbus Operations S.L., Madrid (ES); Universidad Politecnica de Madrid, Madrid (ES)

( * ) Notice: Subject to any disclaimer, the term of this patent is extended or adjusted under 35 U.S.C. 154(b) by 459 days.

(21) Appl. No.: 12/475,682

(22) Filed: Jun. 1, 2009

(65) Prior Publication Data
US 2010/0250205 A1 Sep. 30, 2010

(30) Foreign Application Priority Data
Mar. 31, 2009 (ES) .................................. 200900881

(51) Int. Cl.
*G06F 7/60* (2006.01)
*G06F 17/50* (2006.01)
*G06G 7/48* (2006.01)

(52) U.S. Cl.
USPC ................ 703/8; 703/6; 703/2; 703/7; 701/3; 701/4; 701/13; 701/1

(58) Field of Classification Search
USPC .................... 703/2, 6, 7, 8; 701/1, 3, 4, 13
See application file for complete search history.

(56) References Cited

U.S. PATENT DOCUMENTS

| | | | | |
|---|---|---|---|---|
| 4,080,922 A | * | 3/1978 | Brubaker | 114/282 |
| 5,740,991 A | * | 4/1998 | Gleine et al. | 244/203 |
| 5,796,612 A | * | 8/1998 | Palmer | 701/4 |
| 5,875,998 A | * | 3/1999 | Gleine et al. | 244/195 |
| 6,002,972 A | * | 12/1999 | Palmer | 701/4 |
| 6,253,126 B1 | * | 6/2001 | Palmer | 701/14 |
| 6,412,732 B1 | * | 7/2002 | Amitay et al. | 244/208 |

(Continued)

OTHER PUBLICATIONS

Lucia, David. "Reduced Order Modeling for High Speed Flows with Moving Shocks", 2003.*

(Continued)

*Primary Examiner* — Shambhavi Patel
(74) *Attorney, Agent, or Firm* — Ladas & Parry LLP

(57) ABSTRACT

A computer-aided method suitable for assisting in the design of an aircraft by providing relevant dimensioning values corresponding to an aircraft component in transonic conditions inside a predefined parameter space by means of a reconstruction of the CFD computations for an initial group of points in the parameter space using a POD reduced-order model, comprising the following steps: a) Decomposing for each flow variable the complete flow field into a smooth field and a shock wave field in each of said computations; b) Obtaining the POD modes associated with the smooth field and the shock wave field considering all said computations; c) Obtaining the POD coefficients using a genetic algorithm (GA) that minimizes a fitness function; d) Calculating said dimensioning values for whatever combination of values of said parameters using the reduced-order model. The invention also refers to a system able to perform the method.

15 Claims, 7 Drawing Sheets

(56) References Cited

U.S. PATENT DOCUMENTS

| | | | |
|---|---|---|---|
| 6,654,710 B1* | 11/2003 | Keller | 703/9 |
| 6,752,020 B1* | 6/2004 | Sobotta et al. | 73/702 |
| 7,930,073 B2* | 4/2011 | Glauser et al. | 701/7 |
| 7,954,769 B2* | 6/2011 | Bushnell | 244/213 |
| 7,987,081 B2* | 7/2011 | Velazquez Lopez et al. | 703/9 |
| 2005/0106016 A1* | 5/2005 | Segota et al. | 416/1 |
| 2005/0106017 A1* | 5/2005 | Segota et al. | 416/1 |
| 2006/0058985 A1* | 3/2006 | Arslan et al. | 703/2 |
| 2006/0266106 A1* | 11/2006 | Glauser et al. | 73/147 |
| 2010/0004769 A1* | 1/2010 | Holden et al. | 700/97 |

OTHER PUBLICATIONS

Namgoong, Howoong. "Airfoil Optimization for Morphing Aircraft", Dec. 2005.*

Abo-Hammour et al. "Numerical solution of second-order, two-point boundary value problems using continuous genetic algorithms", Int. J. Numer. Meth. Engng 2004; 61:1219-1242.*

Alonso et al. "Airfoil Design Optimization Using Reduced Order Models Based on Proper Orthogonal Decomposition", 2000.*

Feng et al. "Nonlinear Aeroelasticity Modeling Using a Reduced Order Model Based on Proper Orthogonal Decomposition", 2007 ASME Pressure Vessels and Piping Division Conference.*

Hall et al. "A Discrete Adjoint Approach forModeling Unsteady Aerodynamic Design Sensitivities", 2003.*

Humble et al. "Experimental Investigation of the Three-Dimensional Structure of a Shock Wave/Turbulent Boundary Layer Interaction", 2007.*

Jameson et al. "How Many Steps are Required to Solve the Euler Equations of Steady, Compressible Flow: In Search of a Fast Solution Algorithm", 2001.*

Lambert et al. "Constrained optimization of nacelle shapes in Euler flow using semianalytical sensitivity analysis", Structural Optimization 10, 239-246 © Springer-Verlag 1995.*

Lysenko, Dmitry. "Unstructured Meshes in Unsteady CFD Applications", 2007.*

Mavriplis, Dmitri. "A Discrete Adjoint-Based Approach for Optimization Problems on Three-Dimensional Unstructured Meshes", 2006.*

Maddux, Michael. "Using In-Situ Error Tracking for Mode Selection in Proper Orthogonal Decomposition Reduced Order Modelling", 2006.*

Nadarajah et al. "Optimum Shape Design for Unsteady Three-Dimensional Viscous Flows Using a Non-Linear Frequency Domain Method", 2006.*

Ong et al. "Global Convergence of Unconstrained and Bound Constrained Surrogate-Assisted Evolutionary Search in Aerodynamic Shape Design", 2004.*

Tan, Bui. "Proper Orthogonal Decomposition Extensions and Their Applications in Steady Aerodynamics", 2003.*

Zingg et al. "A comparative evaluation of genetic and gradient-based algorithms applied to aerodynamic optimization", 2008.*

Thomas et al. "Reduced-Order Aeroelastic Modeling Using Proper-Orthogonal Decompostions", 1999.*

Thanh et al. "Parametric Reduced-Order Models for Probabilistic Analysis of Unsteady Aerodynamic Applications", AIAA Journal vol. 46, No. 10, Oct. 2008.*

Alonso D et al: "Robust reduced order modeling of heat transfer in a back step flow". International journal of heat and mass transfer, Pergamon Press, GB LNKD-D0I:10.1016/J.I0HEATMASSTRANSFER.2008.09.0 11, vol. 52, Nos. 5-6 Oct. 30, 2008, pp. 1149-1157, XP025771653 ISSN: 0017-9310 (retrieved on Oct. 30, 2008).

Lorente L S et al: "Generation of aerodynamic databases using high-order singular value decomposition" Journal of Aircraft, AIAA, Reston, VA, US LNKD-D0I:10.2514/1.35258, vol. 45, No. 5, Oct. 31, 2008, pp. 1779-1788, XP009119801 ISSN: 0021-8669.

Alonso D et al: "A method to generate computationally efficient reduced order models" Computer Methods in Applied Mechanics and Enfineering, North-Holland, Amsterdam, NL LNKD-D0I:10.1016/J.CMA.2009.03.012, vol. 198, No. 33-36, Mar. 29, 2009, pp. 2683-2691, XP026144552 ISSN: 0045-7825.

International Search Report and Written Opinion of the International Searching Authority dated Mar. 9, 2010 for Application No. PCT/ES2010/070201.

* cited by examiner

METHOD AND SYSTEM FOR A QUICK CALCULATION OF AERODYNAMIC FORCES ON AN AIRCRAFT IN TRANSONIC CONDITIONS

FIELD OF THE INVENTION

The present invention refers to methods and systems for assisting in the design of aircrafts by making calculations of the aerodynamic forces experimented by an aircraft component in transonic conditions when these forces are dependant of a significant number of parameters.

BACKGROUND OF THE INVENTION

A common situation in practical industrial applications related to product development is the need to perform quick surveys inside a space of state parameters. In mature and very competitive industrial sectors like aerospace, this need is motivated by the drive to generate products having good technical performance within design cycles that are as short as feasible. That is: time is a key factor in aerospace competitiveness because shortening the time market may provide a leading economic advantage during the product life cycle.

In the specific case of aeronautics, the prediction of the aerodynamic forces, and more generally skin surface values distributions, experimented by an aircraft is an important feature, in order to optimally design its structural components so that the weight of the structure is the minimum possible, but at the same time being able to withstand the expected aerodynamic forces.

Thanks to the increase of the use of the Computer Fluid Simulation Capability, nowadays, the determination of the aerodynamic forces on an aircraft is commonly done by solving numerically the Reynolds Averaged Navier-Stokes equations that model the movement of the flow around the aircraft, using discrete finite elements or finite volume models. With the demand of accuracy posed in the aeronautical industry, each one of these computations requires important computational resources.

The dimensioning aerodynamic forces are not known a priori, and since the global magnitude of the forces may depend on many different flight parameters, like angle of attack, angle of sideslip, Mach number, control surface deflection angle, it has been necessary to perform many lengthy and costly computations to properly predict the maximum aerodynamic forces experimented by the different aircraft components or the complete aircraft.

In order to reduce the overall number of these lengthy computations, approximate mathematical modelling techniques have been developed in the past, like Single Value Decomposition (SVD) as a mean to perform intelligent interpolation, or the more accurate Proper Orthogonal Decomposition (POD from now onwards) that takes into account the physics of the problem by using a Galerkin projection of the Navier-Stokes equations.

Given a set of N scalar flow fields in a scalar variable $\phi$ (as the pressure), calculated using Computational Fluid Dynamics (CFD), POD methodology provides N mutually orthogonal POD modes $\Phi_i(\vec{x})$. POD methodology also provides the singular values of the decomposition, which allows truncating the number of POD modes to n<N modes, where n can be selected with the condition that the manifold contains the reconstruction of all computations (also called snapshots hereinafter) within a predetermined error. The manifold spanned by these modes is known as POD manifold, and is the manifold that minimizes distance from the snapshots among the manifolds of dimension n.

POD modes allow us to reconstruct every snapshot as $$\phi(\vec{x}, AoA, M) = \sum_i a_i(AoA, M) \Phi_i(\vec{x})$$

where the scalars $a_i$ are called POD-mode amplitudes and can be calculated upon orthogonal projection of the snapshot on the POD manifold. If the snapshots are appropriately selected, then the POD manifold contains a good approximation of the flow field for values of the parameters (such as angle of attack AoA and the Mach number M), in a given region of the parameter space. For general values of the parameters (not corresponding to the snapshots), we still expand the flow variables in terms of the POD modes as in the equation above and calculate the POD mode amplitudes using a Genetic Algorithm (GA), which selects the amplitudes as the minimizers of a properly defined residual of the governing equations and boundary conditions; such method will be called Genetic Algorithm+Proper Orthogonal Decomposition (GAPOD) hereinafter. This approach provides a good approximation to the exact solution and is flexible, robust, and fairly independent of the number and location of the CFD-calculated snapshots in the parameter space.

However, if the snapshots used to generate the POD manifold exhibit shock waves (as must be expected in transonic conditions) that move significantly as the parameters are varied, then either (a) the resulting POD modes are stair-like shaped (instead of exhibiting the correct one-jump, shock wave shape), which yields a poor approximation, or (b) both the number of required snapshots and the dimension of the POD manifold are quite large. This is because POD approximations consist of linear combinations, and linear combinations of shifted jumps do not give jumps but stairs. This fact implies that low Mach number flow configurations can be predicted with a few POD modes using a plain GAPOD methodology, but high Mach number cases require a more sophisticate method, to preserve the shock wave structures.

The present invention is intended to attend this demand.

SUMMARY OF THE INVENTION

It is an object of the present invention to provide methods and systems for making calculations of the aerodynamic forces experimented by an aircraft component in transonic conditions when these forces are dependant of a significant number of parameters.

It is another object of the present invention to provide methods and systems for allowing a quick calculation of the aerodynamic forces experimented by an aircraft component in transonic conditions.

In one aspect, these and other objects are met by a computer-aided method suitable for assisting in the design of an aircraft by providing dimensioning aerodynamic forces, skin values or values distributions around an airfoil corresponding to an aircraft component in transonic conditions inside a predefined parameter space by means of a reconstruction of the CFD computations for an initial group of points in the parameter space using a reduced-order model, generated by computing the POD modes of the flow variables and obtaining the POD coefficients using a genetic algorithm (GA) that minimizes the error associated to the reduced-order model, comprising the following steps:

Decomposing for each flow variable the complete flow field (CFF) into a smooth field (SF) and a shock wave field (SWF) in each of said computations for an initial group of points.

Obtaining the POD modes associated with the smooth field (SF) and the shock wave field (SWF) considering all said computations.

Obtaining the POD coefficients using a genetic algorithm (GA) that minimizes a fitness function defined using a residual calculated from the Euler equations and boundary conditions.

Calculating said aerodynamic forces, skin values or values distribution for whatever combination of values of said parameters using the reduced-order model obtained in previous steps.

In another aspect, these and other objects are met by a system for assisting in the design of an aircraft by by providing the dimensioning aerodynamic forces, skin values or values distribution around an airfoil corresponding to an aircraft component in transonic conditions inside a predefined parameter space, comprising:

A computer-implemented discrete model of said aircraft component and the surrounding fluid flow field;

A computer-implemented CFD module for calculating and storing said fluid dynamic forces, skin values or values distribution for an initial group of points in the parameter space, including means for decomposing for each flow variable the complete flow field (CFF) into a smooth field (SF) and a shock wave field (SWF).

A computer-implemented POD reduced order model module for performing calculations of said aerodynamic forces, skin values or values distribution for any point in the parameter space including means for obtaining the POD modes associated with the smooth field (SF) and shock wave field (SWF) considering a selected group of CFD computations and for obtaining the POD coefficients using a genetic algorithm (GA) that minimizes a fitness function defined using a residual calculated from the Euler equations and boundary conditions.

The above-mentioned method and system are applicable to the design of aircraft components of aircrafts formed by a cylindrical fuselage, wings in the centre fuselage either in the middle or high or low region of the fuselage, conventional tail or T-tail or Cruciform-tail or V-tail or H-tail or U-tail or canard and engines in the wing or at the rear fuselage and also to the design of aircraft components of aircrafts having a non-classical configuration like a blended wing body (BWB) or a flying wing.

Said set of parameters can be, in particular, any combination of the following (if applicable to the aircraft component being designed): the angle of attack, the sideslip angle, the Mach number, the wing aileron deflection angle, spoilers deflection, high lift devices deflection, canard deflection, landing gear deflected status, landing gear doors angle, APU inlet open angle, the vertical tailplane rudder deflection angle, the horizontal tailplane elevator deflection angle and the horizontal tailplane setting angle. The range of validity of said parameters is that of the aircraft typical flight envelope.

Said aerodynamic forces include in particular the lift force, the drag force, the lateral force, the pitching moment, the rolling moment and the yawing moment of the aircraft component being designed.

Said skin values at the surface include in particular the static pressure, the skin friction, the skin temperature and whatever combination of them. Said values distribution could be, in particular, total force per section (could be a cut, line, surface that form all the object), heat transfer, total friction and generally whatever integral of the skin values or their combination.

Other characteristics and advantages of the present invention will be clear from the following detailed description of embodiments illustrative of its object in relation to the attached figures.

DETAILED DESCRIPTION OF THE INVENTION

An embodiment of a method and a system according to the present invention will now be described in reference to a specific example of the flow around a particular airfoil. CFD is calculated using TAU, which is a finite volume discretization of the compressible continuity, momentum, and energy equations, with viscous terms modified according to an Edwards-corrected-Spalart-Almaras turbulence model, and some stabilization terms added to avoid numerical instabilities.

Figure 1A:
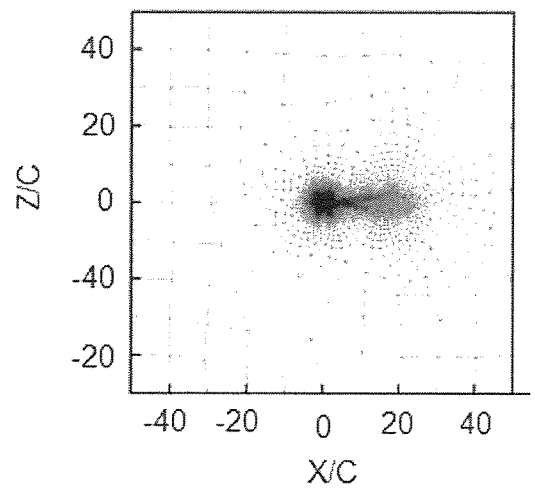
FIG. 1a shows the complete mesh of the computational domain used in a method according to this invention and FIG. 1b shows an O-shaped structured mesh around the airfoild.

The computational domain, which contains 55,578 elements, is shown in FIG. 1a. The outer boundary domain, accounting for the freestream flow, was located 50 chords away from the airfoil. The discretization mesh consists of two parts, an O-shaped structured mesh around the airfoil (which contains 20,458 points) and an unstructured mesh outside this. Thus, some discretization errors are present near the common boundary of both meshes, which (as usually happens with industrial CFD codes) must be added to other localized errors due to turbulence modeling and stabilization terms. The method below is robust in the sense that it is independent of all these. In particular, both stabilization and turbulence modeling terms are completely ignored, since projection on the governing equations is made using Euler equations, which are expected to apply quite approximately except in boundary layers, shear layers, and shock waves, which are all of them quite thin regions.

Figure 1B:
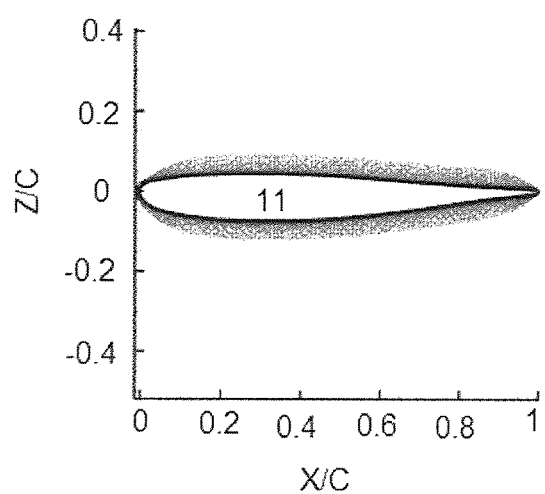

The method will be applied to an airfoil 11 whose shape is plotted in FIG. 1*b*, where the O-mesh is also shown. The parameter space is a rectangle in the AoA-M (angle of attack and Mach number) plane, in the range 3°<AoA<3° and 0.4<M<0.8. It should be noted that such parameter range includes situations in which strong shock waves are present, either in the pressure or suction sides or in both sides in some cases. Still, the shock wave position varies significantly (up to one third of the chord) as the parameters are varied.

The CFD computations (also called snapshots hereinafter) will be performed for the 117 combinations of the following values of the angle of attack and the Mach number:

AoA (13 values)=−3.0, −2.5, −2.0, −1.5, −1.0, −0.5, +0.0, +0.5, +1.0, +1.5, +2.0, +2.5, +3.0.
M (9 values)=0.40, 0.45, 0.50, 0.55, 0.60, 0.65, 0.70, 0.75, 0.80.

Step 1: Defining the Co-Ordinate Systems

Figure 2:
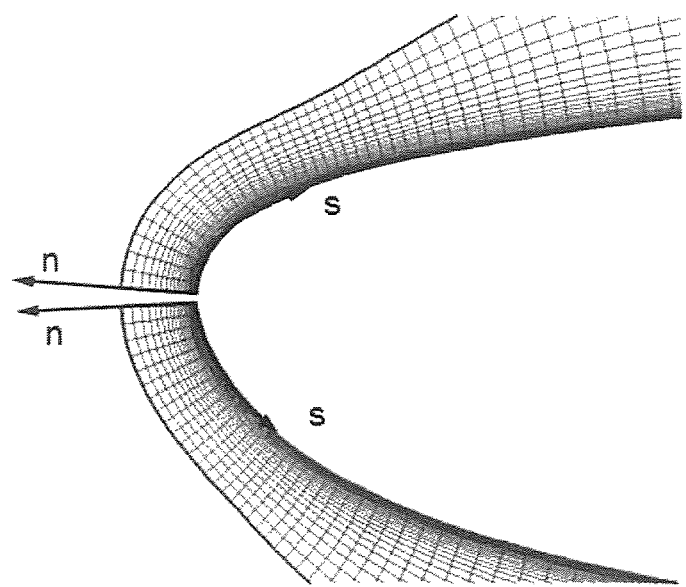
FIG. 2 shows the curvilinear coordinate system used in a method according to this invention.

For the sake of simplicity, an O-shaped curvilinear structured mesh around the airfoil 11 will be only considered and the work will be performed over the pressure and suction sides of the airfoil independently. This approach allows improving computational efficiency considering two distinct curvilinear coordinate systems, one for the pressure side 13 and other for the suction side 15, as shown in the FIG. 2.

The definition of the suction and pressure sides 15, 13 requires to previously defining the leading edge point 17. This point is defined as that point where the tangent to the airfoil 11 is orthogonal to the free stream velocity at zero incidence. The (x,y) coordinate system with origin at the leading edge point is defined such that x-axis also passes through the trailing edge and the y-axis is perpendicular to the x-axis and points towards the suction side.

From now on, the x and y physical co-ordinates will not be used. Instead, two curvilinear coordinates s and n will be used, along lines parallel to the airfoil 11 and perpendicular to it, respectively; in addition, a third coordinate r is considered that takes the values +1 and −1 in the suction and pressure sides. And instead of the original flow variables, the density, the pressure, and the mass fluxes in the x and y directions will be used.

Step 2: Obtaining Dimensionless Variables

The four flow variables: density, pressure, and mass fluxes are non-dimensionalized using their respective free stream values (labeled with the subscript BC) in the far upstream region (called the BC region), where the inlet boundary conditions are imposed. The reference values are $$\rho_{ref} = \rho_{BC}, \ p_{ref} = p_{BC}, \ (\rho u, \rho w)_{ref} = \frac{(\rho u, \rho w)_{BC}}{M}$$

Thus, the dimensionless density and pressure in the BC region are both equal to one, but the dimensionless mass fluxes in this region are $(\rho u, \rho w)_{BC} = M(\cos AoA, \sin AoA)$ Step 3: Obtaining the Shock Wave Position (Over the Airfoil) and the Trace of the Shock Wave for Every Snapshot For each coordinate line n=constant, the method first identifies the location of the shock wave in this line, and then considers the surroundings of this point.

The criterion for evaluating whether a given snapshot has shock wave or not is as follows. First, we evaluate the derivative of $C_p$ along the x axis over the surface of the airfoil, where $C_p$ is the pressure coefficient, defined in terms of the specific heat ratio γ, as $$C_p = 2\frac{p-1}{\gamma M^2}.$$

Figure 3:
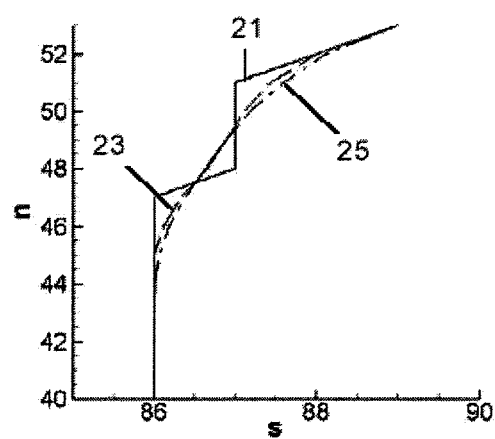
FIG. 3 shows the position of a shock wave as a function of the n coordinate without and with convolutions applied in a method according to this invention.

If there is at least one point that verifies the inequality $$\frac{\partial C_p}{\partial x} > \theta_1,$$

being $\theta_1$ a predetermined value ($\theta_1$=9.0 in the above-mentioned example) then it is considered that this particular snapshot has a shock wave, provided that the point where the x-derivative of $C_p$ is maximum is located at a distance from the leading edge 17 that is greater than 1.5% of the airfoil chord; otherwise, the steep gradient is considered to be a part of the suction peak near the leading edge, and is ignored. The shock wave position in the particular line n=constant that is being considered is defined as that mesh point where the x-derivative of $C_p$ is largest. Thus, we have defined the shock wave position at each coordinate line n=constant, as loc(n)=$s_n$. As defined above, the values of $s_n$ are necessarily integer numbers, which means that the function loc(n) is slightly stair-like shaped. Thus, such function is first smoothed out using a convolution, defined as $$s_1^{convoluted} = s_1$$

$$s_2^{convoluted} = \frac{1}{4}(s_1 + 2s_2 + s_3)$$

$$s_i^{convoluted} = \frac{1}{9}(s_{i-2} + 2s_{i-1} + 3s_i + 2s_{i+1} + s_{i+2}) \ 2 < i < h-1$$

$$s_{h-1}^{convoluted} = \frac{1}{4}(s_{h-2} + 2s_{h-1} + s_h)$$

$$s_h^{convoluted} = s_h$$

where h is the total number of points of the Cartesian mesh in the n direction and s is the convoluted variable (the position of the shock wave). Such convolution is applied twice. In the example being considered the smoothing effect of convolution is illustrated in FIG. 3 where the position of the shock wave in the pressure side is considered as a function of the co-ordinate n in the case AoA=−3.0° and M=0.8.

Line 21 is loc(n) without convolution, line 23 is loc(n) with a convolution applied once, and line 25 is loc(n) with a convolution applied twice Once we have the shock wave located in each coordinate line through a smooth function, the shock wave position $s_w$ on the airfoil 11 is defined as $s_w = s_1^{convoluted}$ and the trace, t(n), as $t(n) = s_n^{convoluted} - s_w$ For those snapshots which do not exhibit a shock wave, we must also define a position over the wall and a trace. These false structures will only be used to find an initial guess of the possible shock wave structures at points of the parameter space that are in between of snapshots with and without shockwave. Due to this fact, we define the false trace of a snapshot without shockwave as the same as that of the nearest snapshot in the parameter space that exhibits a shock wave.

Step 4: Obtaining the Smooth and Shock Wave Fields for Every Snapshot

In order not to lose information (preserving the original snapshots), the shape of the SF in the surroundings of the shock wave position is defined and the SWF is obtained subtracting the original snapshot from the SF according to the following method.

First, for each coordinate line n=constant the shock wave interval is defined as $[s_w+t(n)-\text{thickness}+1, s_w+t(n)+\text{thickness}]$, where the parameter thickness depends on the particular set of snapshots and the mesh, and is defined as small as possible but such that the end-points of the interval both satisfy $$\frac{\partial C_p}{\partial x} < \theta_2$$

being $\theta_2$ a predetermined value ($\theta_2=6.0$ in the above-mentioned example).

The parameter thickness in the example under consideration is set as 12 mesh points.

This definition allows both (a) describing well the internal structure of the shock wave and (b) keeping the SFs really smooth.

Figure 4:
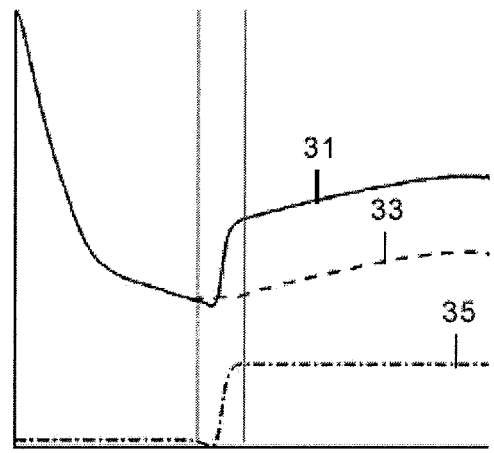
FIG. 4 shows an sketch of the decomposition of a complete flow field (CFF) into a smooth field (SF) and a shock wave field (SWF) performed in a method according to the present invention.

Once the shock wave interval has been defined, the SF is first defined in the shock wave interval using a straight line joining the values of the flow field variable at the end points of the interval; thus we have a continuous structure that may exhibit jumps in the spatial derivative, which are smoothed out applying twice the same convolution defined in Step 3, where h is now the thickness of the shock wave and the sub-indexes must be appropriately shifted to account for their values in the shock wave interval. The shock wave field (SWF) is the result of subtracting the CFF from the SF. FIG. 4 shows a sketch of the division of the CFF 31 into the SF 33 and SWF 35.

As it can be seen in FIG. 4, the method provides smooth s-derivatives; the n-derivatives have proved to be smooth enough too. And, as expected, the method provides a fairly smooth shock wave and smooth fields.

Figure 5:
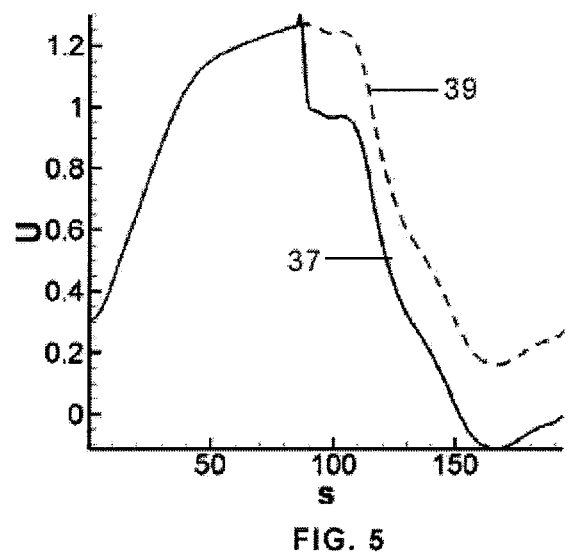
FIG. 5 shows an original CFD calculation and its corresponding smooth field SF obtained with a method according to the present invention.

Final results of the CFD 37 and the SF 39 in a representative case of a shock wave having a thickness=12 mesh points and applying 2 convolutions are shown in FIG. 5.

The process described above must be applied to treat the four flow variables in all snapshots, including those that do not verify the criterion for existence of the shock wave (see Step 3).

At this stage, the shock wave position, the trace, the jump, and the smooth field are defined as functions of the type $$s_w = s_w(AoA, M),$$

$$t = t(AoA, M, n),$$

$$\Delta\phi = \Delta\phi(AoA, M, n),$$

$$\phi^{SF} = \phi^{SF}(AoA, M, s, n).$$

It shall be taken into account that $\Delta\phi$ and $\phi^{SF}$ must be defined for each flow variable.

Step 5: Obtaining the Internal Shape and Jump of the Shock Wave for Every Snapshot For each flow field variable, the internal shape of the shock wave is defined as that part of the SWF contained in the shock wave interval, scaled with the total jump of the variable across the shock wave interval. The latter will be called jump of the corresponding variable. Using this definition, the internal shape retains the unphysical overshooting effect (seemingly, an artifact of stabilization terms in the CFD numerical code), which is sometimes found near the shock wave and makes the internal shape not completely smooth.

This process must be applied to the four flow variables and to all the snapshots, including those which do not verify the criterion for shock wave existence, given in Step 3 above. For the latter snapshots, the jump and the internal shape cannot be calculated as above; instead, the jump of the variables is set to zero and the internal shape is imposed to be the sigmoidal function $$\phi^r_s(s, n) = \frac{1}{1 + e^{-\xi(s)}}$$

where the function $\xi(s)$ have been calibrated as $$\xi(s) = 7 + \frac{14}{2 \cdot \text{thickness} - 1}(s - s_w - t(n) - \text{thickness})$$

Step 6: Obtaining the POD Manifold for the Trace of the Shock Wave

Figure 6:
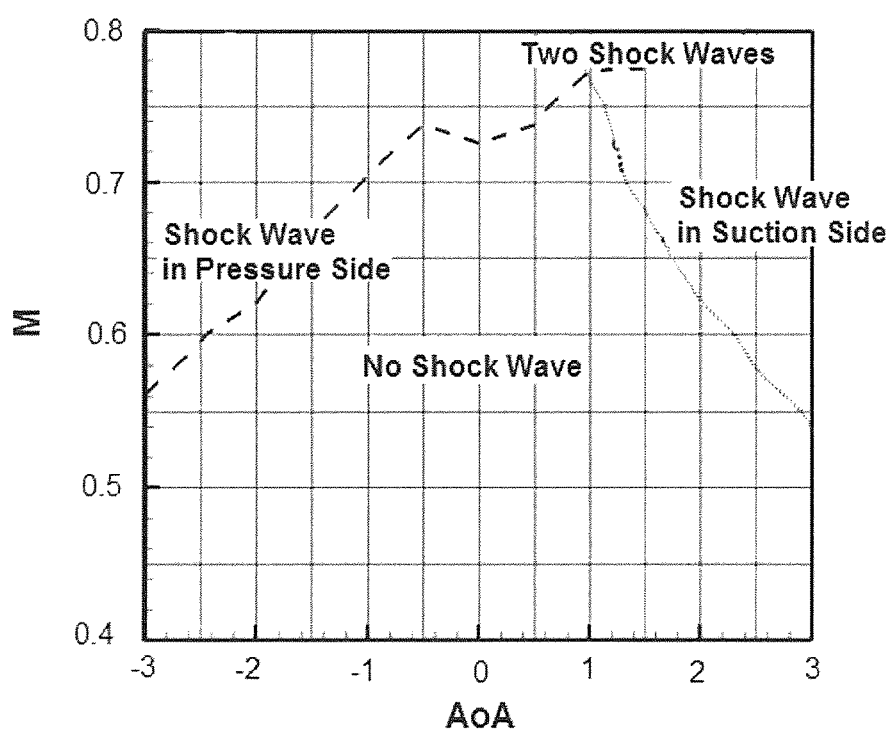
FIG. 6 illustrate the regions in the parameter space with and without shock waves.

As explained above, the trace of the shock wave is a function of the parameters and the normal co-ordinate n. Isolating dependence on n, a POD basis can be calculated in terms of spatial modes that depend only on n. Thus POD modes $T_i$ are calculated using the covariance matrix $$R_{ij} = \langle t_i, t_j \rangle = \frac{1}{h}\sum_{n=1}^{h} t(AoA_i, M_i, n) t(AoA_j, M_j, n)$$

where the inner product $\langle , \rangle$ could also be used to define distances between different traces. Thus, the trace is written as an expansion in POD modes, as $$t(AoA, M, n) = \sum_i b_i(AoA, M) T_i(n),$$

where the POD-mode amplitudes $b_i$ will be calculated below. The POD modes are calculated using all available snapshots, even those that exhibit false shock waves. The regions in the parameter space with and without shock waves in the example being considered are shown in FIG. 6.

Step 7: Obtaining the POD Manifold for the Internal Shape of the Shock Wave

The internal shape has been defined above, in Step 5, for each flow variable and is a function of the parameters and the curvilinear co-ordinates s and n. As in Step 6, we define spatial POD modes (depending on s and n) using POD methodology, with the covariance matrix $$R_{ij} = \langle (\rho u, \rho w, \rho, p)_i, (\rho u, \rho w, \rho, p)_j \rangle =$$

$$= \sigma \sum_{s=1-\text{thickness}}^{\text{thickness}} \sum_{n=1}^{h} \rho u(AoA_i, M_i, s, n) \rho u(AoA_j, M_j, s, n) + +$$

-continued $$\sigma \sum_{s=1-thickness}^{thickness} \sum_{n=1}^{h} \rho w(AoA_i, M_i, s, n)\rho w(AoA_j, M_j, s, n) + +$$

$$\sigma \sum_{s=1-thickness}^{thickness} \sum_{n=1}^{h} \rho(AoA_i, M_i, s, n)\rho(AoA_j, M_j, s, n) + +$$

$$\sigma \sum_{s=1-thickness}^{thickness} \sum_{n=1}^{h} p(AoA_i, M_i, s, n)p(AoA_j, M_j, s, n)$$

where the common scaling factor is defined as $\sigma = (2 \cdot thickness \cdot h)^{-1}$ and the inner product above $\langle , \rangle$ can be used to define distances between snapshots. Now, the flow variables as expansions on the POD modes, $U_i^{IS}$, $W_i^{IS}$, $R_i^{IS}$, and $P_i^{IS}$, are written down as $$(\rho u)^{IS} = \sum_{i=1}^{N} c_i(AoA, M) U_i^{IS}(s, n),$$

$$(\rho w)^{IS} = \sum_{i=1}^{N} c_i(AoA, M) W_i^{IS}(s, n),$$

$$\rho^{IS} = \sum_{i=1}^{N} c_i(AoA, M) R_i^{IS}(s, n),$$

$$p^{IS} = \sum_{i=1}^{N} c_i(AoA, M) P_i^{IS}(s, n),$$

where $c_i$ are the POD-mode amplitudes, which are common to the four flow variables and will be calculated below. The POD manifolds are calculated using all the available snapshots that exhibit shock waves (according to the criterion of shock wave existence in Step 3 above).

Step 8: Dividing the Smooth Field into Regions

The smooth flow field (SF) exhibits a very different topology on the pressure and suction sides. Thus, calculating common POD modes for both zones has proved not to be a good option. A better choice consists of using different POD modes (and amplitudes) in the pressure and suction sides. In order to obtain a POD manifold that provides a good description in the whole O-mesh, the O-mesh is divided into two zones 41, 43, which are as shown in FIG. 6. It must be noted that they share a common sub-region 45 near the leading edge 17.

The general criterion for obtaining the size of the zones is including in the zone the whole region we intend to describe (either the suction or the pressure side) plus that sub-region in the opposite side bounded by the leading edge point 17 and a cross section of the O-mesh defined by $s = s_{crit}$, where $s_{crit}$ is the difference between the minimum value of the shock wave position $s_w$ among the ones obtained in Step 3 and the thickness of the shock wave (defined in Step 4).

Step 9: Selecting the Snapshots Used to Calculate the POD Modes of the Smooth Field Using all available snapshots to generate the POD manifold for each zone has demonstrated not to give good enough results. Therefore, a method has been developed to select the most convenient snapshots, which depend on the particular values of the parameters that are being considered; thus the selection is a local selection in the parameter space. The algorithm proceeds as follows:

To begin with, the $s_w$ parameter is interpolated (using cubic polynomials) to obtain a first approximation of $s_w$, which will be used both in the iterative process below and as an initial guess for the GA. It must be noted that $s_w$ is only a scalar that depends on the parameters; thus, an initial guess follows by interpolation on the already known values of $s_w$ for neighboring points (corresponding to snapshots) in the parameter space. No spatial POD is needed.

The SF is also interpolated using neighboring snapshots, point-by-point, to obtain an initial rough approximation.

Figure 7:
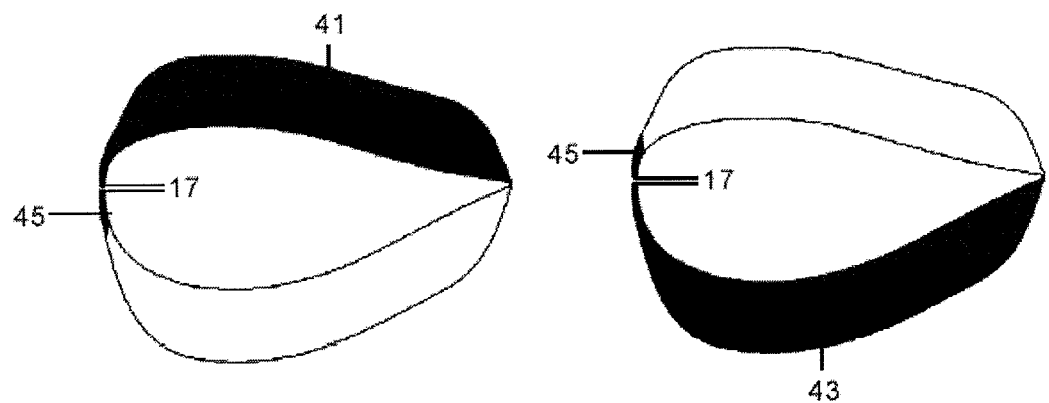
FIG. 7 shows two zones in the pressure and suction sides used to calculated the POD manifold of the smooth field (SF) in a method according to the present invention.

An interval of size L centered on the initial guess of $s_w$ is defined. The GA is going to look for the actual value of $s_w$ only inside this interval. Thus, the parameter L must is calibrated in each run. It should take a value of the order of the expected error in this scalar. Once the value of L is chosen (i.e. 10 mesh points, approximately 5% of the chord), the pressure and suction sides are divided into three regions 51, 53, 55 (see FIG. 7):

The leading edge region (LER) 51: $s < s_w - L$
The shockwave region (SWR) 53: $s_w - L \leq s \leq s_w + L$
The trailing edge region (TER) 55: $s > s_w + L$ If a shock wave is expected, then those snapshots that exhibit a shock wave outside this interval will not be used to calculate the POD manifold. If instead, no shock wave is expected, then only snapshots without shock wave will be used.

Now, a distance from each snapshot (labeled with the index j) to the approximated SF is defined. Such distance, $D_j$, is defined as the orthogonal projection of the smooth fields of the snapshot j, $(\rho u, \rho, p)_j$, on the interpolated smooth field calculated above, $(\rho \tilde{u}, \tilde{\rho}, \tilde{p})$, namely $$D_j = \frac{\langle (\rho \tilde{u}, \tilde{\rho}, \tilde{p}), (\rho u, \rho, p)_j \rangle}{\sqrt{\langle (\rho \tilde{u}, \tilde{\rho}, \tilde{p}), (\rho \tilde{u}, \tilde{\rho}, \tilde{p}) \rangle} \sqrt{\langle (\rho u, \rho, p)_j, (\rho u, \rho, p)_j \rangle}}$$

Such projection is made using the following inner product $$\langle (\rho u, \rho, p)_1, (\rho u, \rho, p)_2 \rangle =$$
$$= \frac{1}{\int dA} \left( \int \rho u_1(s, n) \rho u_2(s, n) dA + \int \rho_1(s, n) \rho_2(s, n) dA + \int p_1(s, n) p_2(s, n) dA \right)$$

The selected snapshots to evaluate the correlation matrix are the N nearest snapshots with the distance above, where N is a number that is large enough to define the POD manifold; a value of N of the order of the double of the expected POD manifold dimension is a good choice. The following criterion, directly derived from well known POD formulae, is used to predict global root mean square errors (GRMSE) for a given a number of modes M $$GRMSE = \sqrt{\sum_{i=M+1}^{N} \lambda_i / \sum_{i=1}^{N} \lambda_i} < \varepsilon$$

where $\lambda_i$ are the eigenvalues of the correlation matrix, N is the total number of snapshots used to evaluate the correlation matrix, and the upper bound $\varepsilon$ is to be chosen after some calibration. The formula above allows to estimate the required number of modes M to be retained for a given accuracy, $\varepsilon$ (i.e. $\varepsilon = 10^{-3}$).

As a last step, we define a safety factor F>1 and retain F times M (instead of M) modes to evaluate the POD manifold that will be finally used by the GA. It must be noted that this number of modes can be either smaller than N.

Step 10: Obtaining the POD Manifold for the Smooth Field and the Complete Flow Field The POD modes of the smooth field are calculated from the covariance matrix $$R_{ij} = \langle (\rho u, \rho, p)_i, (\rho u, \rho, p)_j \rangle$$

where $\langle , \rangle$ is the inner product defined in Step 9. The resulting POD modes allows us to write the flow variables as $$(\rho u)^{SF} = \sum_i a_i(AoA, M) U_i^{SF}(s, n),$$

$$(\rho w)^{SF} = \sum_i a_i(AoA, M) W_i^{SF}(s, n),$$

$$\rho^{SF} = \sum_i a_i(AoA, M) R_i^{SF}(s, n),$$

$$p^{SF} = \sum_i a_i(AoA, M) P_i^{SF}(s, n),$$

where, as above, $a_i$ are the POD-mode amplitudes, which are common to the four flow variables and are to be calculated.

Now, we take advantage that, by definition, the smooth field exactly coincides with the complete field in the leading edge region located on the left of the shock waves, namely as $0 < s < s_{crit}$ in both the pressure and suction sides, where $s_{crit}$ is as defined in Step 9. Thus, we define modes on the complete flow field, $U_i^{FF}$, $W_i^{FF}$, $R_i^{FF}$, and $P_i^{FF}$ as those combinations of the original snapshots such that $U_i^{FF} = U_i^{SF}$, $W_i^{FF} = W_i^{SF}$, $R_i^{FF} = R_i^{SF}$, $P_i^{FF} = P_i^{SF}$ in the leading edge region. This is done writing down the CFF modes as linear combinations of the original snapshots with the same coefficients that appear when the SF modes are written in terms of the snapshots associated with the smooth fields. Thus, since both the snapshots and the POD modes of both the complete fields and the smooth fields exactly coincide in the leading edge region, the complete fields can be reconstructed using the same values of the POD amplitudes used above to reconstruct the smooth field, namely $$(\rho u)^{CFF} = \sum_i a_i(AoA, M) U_i^{CFF}(s, n),$$

$$(\rho w)^{CFF} = \sum_i a_i(AoA, M) W_i^{CFF}(s, n),$$

$$\rho^{CFF} = \sum_i a_i(AoA, M) R_i^{CFF}(s, n),$$

$$p^{CFF} = \sum_i a_i(AoA, M) P_i^{CFF}(s, n).$$

Now, the resulting POD modes on the CFF could lead to large errors in the spatial derivatives of the normal velocity component (perpendicular to the airfoil), which is significantly smaller than the tangential component. This is due to the fact that the CFD code could be based on finite volume or finite element discretization, while the derivatives are naturally calculated using finite differences. In order to avoid such errors, one of the velocity components or the POD modes in the CFF, u or w, is recalculated integrating the continuity equation, namely $$\frac{\partial(\rho u)}{\partial x} + \frac{\partial(\rho w)}{\partial z} = 0,$$

with the remaining variables maintained at their original values.

The algorithm to integrate the continuity equation can be sketched as follows. First we note that because the flow is almost parallel in the O-mesh (near the airfoil), the estimate $\rho w / \rho u < 1$ applies except in a region near the leading edge, which is bounded by those points, in both the pressure and the suction sides, denoted as $s_{limit}$, where $\rho w / \rho u = 1$. Thus, the unknown to be calculated in this region is u, while it is w in the remaining part of the O-mesh. In each of these regions, we rewrite the continuity equation in (s,n) co-ordinates as $$z_n \frac{\partial(\rho u)}{\partial s} - z_s \frac{\partial(\rho u)}{\partial n} - x_n \frac{\partial(\rho w)}{\partial s} + x_s \frac{\partial(\rho w)}{\partial n} = 0$$

where $x_s$, $x_n$, $z_s$, and $z_n$ are the derivatives of the physical co-ordinates, x and z, with respect to the curvilinear coordinates s and n. Now we note that this is a first order equation in the n coordinate, which can be integrated marching in n with the leap frog scheme described below and using as initial condition at the first value of n (n=1) the no slip boundary condition at the surface of the airfoil (u=w=0). s-derivatives are discretized using centered differences in interior points and forward and backward derivatives at the upper and lower limit points, respectively; n-derivatives instead are discretized using forward differences at n=1, and centered differences at n>1. According to such discretization, marching on n is made with an implicit method at n=2, and with an explicit method for n>2. Note that we are not using here forward differences to march in n using an implicit scheme because such strategy would produce an error contamination from the lateral boundaries (namely, the extreme values of s) to the interior or the domain. By construction, the resulting mass flux vector is not continuous at the extreme values of s. Thus, the mass flux must be smoothed, which is done in three steps, as follows:

Firstly it is defined the length $L_2$ as the semi-amplitude of the interval in which the mass flux vector is going to be smoothed. After some calibration, $L_2$=2.5% of the chord is taken (e.g., 5 nodes in the example being considered). Two zones, $[s_{limit}-2L_2, s_{limit}]$ and $[s_{limit}, s_{limit}+2 L_2]$, are defined which will be used to smooth the horizontal and vertical mass fluxes, respectively.

The complete field is overlapped with the corrected one using the following formula $$\rho u^{corrected}(s,n) = \text{mask}(s) \rho u^{FF}(s,n) + (1-\text{mask}(s)) \rho u^{integrated}(s,n),$$

$$\rho w^{corrected}(s,n) = \text{mask}(s) \rho w^{integrated}(s,n) + (1-\text{mask}(s)) \rho w^{FF}(s,n),$$

where mask(s) is the sigmoidal function given in Step 5, except for the term $s_w + t(n)$, which is substituted by $s_{limit} \mp L_2$ (the – and + signs corresponding to the horizontal and vertical mass fluxes, respectively) and the thickness, which is substituted by $L_2$.

Step 11: Obtaining an Initial Guess of the POD Amplitudes

An initial guess (needed in the GA) of the sets of amplitudes, $a_i$, $b_i$, and $c_i$, can be calculated by interpolation.

The number of modes, $\tilde{N}$, which must be used for every structure in order to reconstruct the pressure over the airfoil is obtained using that criterion given in Step 9 for predicting the global root mean square error (GRMSE).

The initial guess for the GA is obtained by interpolation on the amplitudes of neighboring snapshots.

Step 12: GA Minimization of a Residual to Calculate the POD Mode Amplitudes of the Smooth Field The unknown amplitudes $a_i$ (two sets of amplitudes, for the pressure and suction sides) are calculated upon minimization of a properly defined residual using a Genetic Algorithm (GA). Such residual is defined from the Euler equations and the boundary conditions. Using the dimensionless variables defined in Step 2, the Euler equations are written as $$eq_1 \equiv \frac{\partial(\rho u)}{\partial x} + \frac{\partial(\rho w)}{\partial z} = 0,$$

$$eq_2 \equiv \rho u \frac{\partial(\rho u)}{\partial x} + \rho w \frac{\partial(\rho u)}{\partial y} + \beta \rho u + \frac{1}{\gamma}\frac{\partial p}{\partial x} = 0,$$

$$eq_3 \equiv \rho u \frac{\partial(\rho w)}{\partial x} + \rho w \frac{\partial(\rho w)}{\partial y} + \beta \rho w + \frac{1}{\gamma}\frac{\partial p}{\partial y} = 0,$$

$$eq_4 \equiv \rho u \frac{\partial p}{\partial x} + \rho w \frac{\partial p}{\partial y} + \gamma \beta p - \frac{p}{\rho}\left(\rho u \frac{\partial \rho}{\partial x} + \rho w \frac{\partial \rho}{\partial y}\right) = 0,$$

where the function $\beta$ is given by $$\beta = eq_1 - \frac{\rho u}{\rho}\frac{\partial \rho}{\partial x} - \frac{\rho w}{\rho}\frac{\partial \rho}{\partial y}.$$

The boundary conditions at the free stream are $$BC_1 = \rho u - M\rho \cos(AoA)$$

$$BC_2 = \rho w - M\rho \sin(AoA),$$

$$BC_3 = \rho - 1$$

$$BC_4 = p - 1.$$

The residual to be minimized by the GA is $$H = \sum_{k=1}^{N_E}\sum_{i=1}^{4}\sqrt{|eq_i(s_k, n_k)|} + \sum_{m=1}^{N_{BC}}\sum_{i=1}^{4}\sqrt{|BC_i(s_m, n_m)|},$$

where $eq_i$ and $BC_i$ stand for the left hand sides of the equations and boundary conditions above, which (as indicated in the expression for H) are evaluated only at some points $(s_k, n_k)$ and $(s_m, n_m)$ of the O-mesh and the BC region (defined in Step 2), respectively; in particular, the selected points in the O-mesh are taken outside the boundary layer and not to close to the upper boundary of the O-mesh, to avoid viscous effects (not accounted for in the Euler equations) and CFD errors, respectively. Using only a small number of points, instead of all points in the O-mesh has proven to give good results, provided that the selected points include enough information on the CFD solutions and that regions with large CFD errors are excluded. The number of selected points must be just somewhat larger than the number of POD modes (four times the number of POD modes gives good results in the example considered below). The selected points can be chosen either randomly or equispaced without losing precision in the results. Here, we chose the points in the structured O-mesh as equispaced in both directions. In the n direction, we take 4 (this number has been calibrated) equispaced values of n (excluding both the boundary layer and the vicinity of the upper limit of the O-mesh, as explained above). In the s direction we take 30 (again, this number can be calibrated) equispaced points outside the SWR (defined in Step 9) to avoid that region where the considered snapshots exhibit shock waves. Thus, the total number of points to evaluate the residual in the example below is 4×30=120, instead of the 20,458 points that are present in the O-mesh, which leads to a significant CPU time saving when applying the GA.

The residual defined above is evaluated using the reconstructed solution in terms of the POD-modes associated with the CFF, using the expansions in terms of these modes given in Step 10. Note that these modes exhibit unphysical stair-like structures, which are due to the fact that these modes are linear combinations of the original snapshots, which exhibit shock waves. But these modes are used only in the region where the residual is calculated, which excluded the SWR where shock waves exist, as explained above.

Now, minimizing the residual provides the set of POD-modes for the reconstructed solution outside the shock wave region SWR. If these same values of the amplitudes are used to reconstruct the smooth field in terms of the associated smooth modes, the resulting reconstructed smooth field coincides with the complete field in the leading edge region LER, but not in the trailing edge region TER (see Step 9 for the definition of these regions) and the difference between both in the trailing edge region provides the jump across the shock wave.

Three remarks on this step are now in order:

This step provides both a reconstruction of the smooth field and the jump across the shock wave.

It is the Euler equations and not the original modified Navier-Stokes equations+turbulence model that are applied to calculate the residual. And still, the equations are applied in their differential form even though the CFD simulations that provided the snapshots could be based on a different discretization. These facts make the method independent on the possible models of turbulence/numerical stabilizers that might have been used, which is convenient in industrial applications.

Only a small number of points (less than 120) is used to evaluate the residual that is minimized by the GA, which saves CPU time without reducing the accuracy of the obtained solutions.

Step 13: GA Minimization of a Residual to Obtain the Position, the Trace, and the Internal Structure of the Shock Wave Once the smooth part of the solution and the jumps across the shock wave have been obtained, only the trace and internal shockwave shape remain to be calculated.

Now, we use the conservative form of the Euler equations. Using the same dimensionless variables defined in Step 12 and integrating the equations in a domain $\Omega$ (which will be below a rectangular domain in the curvilinear coordinate system (s,n)), we integrate these equations and apply the divergence theorem to obtain $$eq_1 \equiv \alpha \oint [\rho u n_x + \rho w n_z] dl = 0,$$

-continued $$eq_2 \equiv \alpha \oint \left[\left(\frac{\rho u \rho u}{\rho} + \frac{1}{\gamma}p\right)n_x + \left(\frac{\rho u \rho w}{\rho}\right)n_z\right] dl = 0,$$

$$eq_3 \equiv \alpha \oint \left[\left(\frac{\rho u \rho w}{\rho}\right)n_x + \left(\frac{\rho w \rho w}{\rho} + \frac{1}{\gamma}p\right)n_z\right] dl = 0,$$

$$eq_4 \equiv \alpha \oint [\delta(\rho u n_x + \rho w n_z)] dl = 0,$$

where the line integrals are extended to the boundary of the domain $\Omega$, l is the arclength along the boundary, and $$\delta = \frac{1}{\rho^2}\left[\rho p + \frac{\gamma-1}{2}(\rho u \rho u + \rho w \rho w)\right], \alpha = \left(\oint dl\right)^{-1}.$$

The contour integrals are approximated by the trapezoidal rule.

Now, the residual to be minimized by the GA is defined in terms of the right hand sides of the conservation equations above as $$H = \sum_{cycles} \sum_{i=1}^{4} \sqrt{|eq_i|}$$

Figure 8:
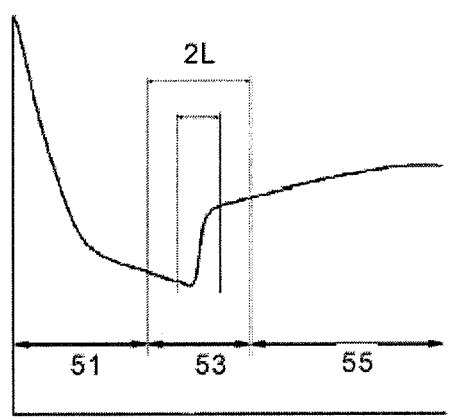
FIG. 8 shows an sketch of the regions in which the airfoil is divided taking into account the size of the shock wave interval.

The contour integrals are applied over a set of closed curves that will be called cycles below. These cycles have a rectangular shape in the curvilinear (s,n) coordinates and are centered on the initial guess of the shock wave position over the wall. The aspect ratio and number of cycles depend on the structure we are calculating. FIG. 8a shows the cycle for evaluating the position over the wall. FIG. 8b shows the cycles for evaluating the trace. FIG. 8c shows the cycles for evaluating the internal shape. In all cases, cycles are contained in a region that extends vertically from the edge of the upper boundary of the O-mesh, excluding a zone to avoid localized CFD errors; horizontal extension coincides with the SWR. Inside this region, the cycles are as follows:

When calculating the position (see FIG. 8a), we use only one cycle that is as wide as possible within the above mentioned region.

When calculating the trace (see FIG. 8b), we use as many cycles as possible that have a height equal to one mesh interval and a width equal to the width of the SWR.

When calculating the internal shape (see FIG. 8c), the cycles are the same as the ones used for the trace but with a width equal to thickness of the shockwave defined in Step 3.

Step 14: Iteration

As described above, calculation of the complete solution involves four independent minimization processes, which can be subsequently applied by the user in an iterative way until the required accuracy is reached. For instance, if the uncertainty on the initial guess of the shock wave position, $s_w$, is not small enough, then the smooth field will be calculated with little accuracy; but after applying the minimization process over the position, a better approximation of $s_w$, will be obtained that will allow a better calculation of the smooth field, which will allow using a smaller uncertainty interval.

Figure 9A:
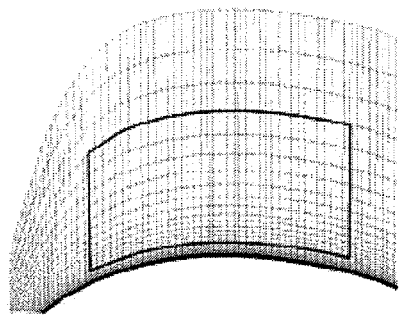
FIGS. 9a, 9b and 9c show the cycles used for evaluating the fitness.
Figure 9B:
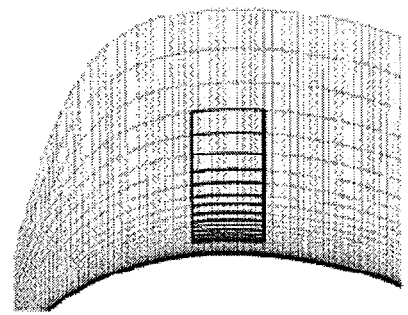
Figure 9C:
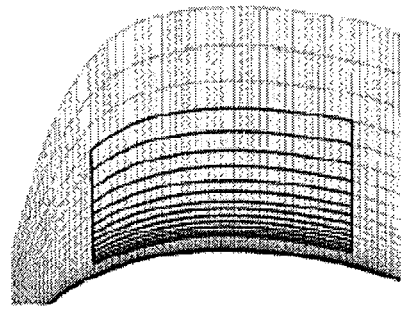
Figure 10:
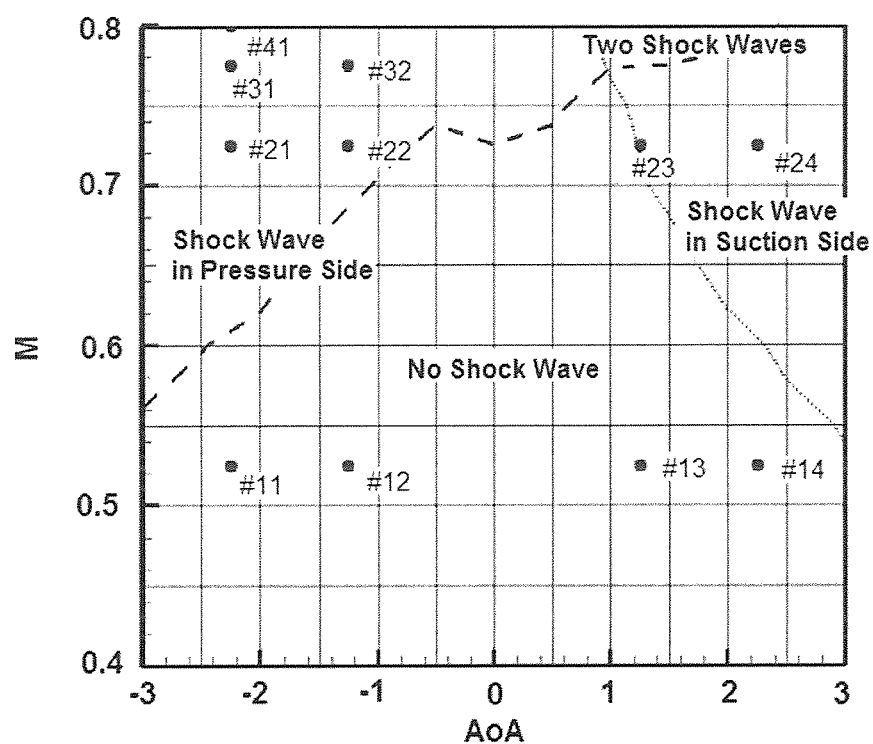
FIG. 10 illustrate the position of the test points in the parameter space that are used for comparing the results obtained with a method according to this invention and with a known method.

The various minimization processes are applied in the following order:
Smooth Field
Position
Trace
Position
Internal shape
Position
Trace
Position
Results To assess the behavior of the method, the aerodynamic coefficients (namely, the lift, drag, and momentum coefficients) and the $C_p$ distribution along the chord have been reconstructed in 11 test points, listed in the following table (and shown in FIG. 11 with the same content than FIG. 9 plus said test points).

| Test Point | AoA | Mach number |
|---|---|---|
| #11 | −2.25 | 0.525 |
| #12 | −1.25 | 0.525 |
| #13 | 1.25 | 0.525 |
| #14 | 2.25 | 0.525 |
| #21 | −2.25 | 0.725 |
| #22 | −1.25 | 0.725 |
| #23 | 1.25 | 0.725 |
| #24 | 2.25 | 0.725 |
| #31 | −2.25 | 0.775 |
| #32 | −1.25 | 0.775 |
| #41 | −2.25 | 0.800 |

The values of the Lift Coefficient $C_L$, the Drag Coefficient $C_M$ and the Pitching Moment Coefficient $C_M$ resulting from the pressure distribution and viscous stresses on the surface of the airfoil are given in the following table, both as calculated with the method according to this invention and as resulting from CFD calculations. Note that even the drag coefficient $C_D$ is reasonably well calculated in spite of the fact that only the Euler equations have been used in our method.

| Test Point | $C_L$ | | $C_D$ | | $C_M$ | |
|---|---|---|---|---|---|---|
| | CFD | GAPOD | CFD | GAPOD | CFD | GAPOD |
| #11 | −0.518 | −0.518 | 0.005 | 0.004 | 0.033 | 0.034 |
| #12 | −0.379 | −0.380 | 0.005 | 0.005 | 0.033 | 0.034 |
| #13 | −0.033 | −0.032 | 0.005 | 0.004 | 0.033 | 0.034 |
| #14 | 0.106 | 0.108 | 0.005 | 0.004 | 0.034 | 0.034 |
| #21 | −0.699 | −0.658 | 0.013 | 0.012 | 0.044 | 0.044 |
| #22 | −0.529 | −0.499 | 0.000 | 0.003 | 0.038 | 0.036 |
| #23 | −0.044 | −0.045 | 0.003 | 0.003 | 0.043 | 0.044 |
| #24 | 0.146 | 0.150 | 0.001 | 0.003 | 0.049 | 0.050 |
| #31 | −0.574 | −0.592 | 0.033 | 0.032 | 0.072 | 0.073 |
| #32 | −0.529 | −0.515 | 0.021 | 0.016 | 0.072 | 0.069 |
| #41 | −0.500 | −0.495 | 0.040 | 0.040 | 0.080 | 0.080 |

Modifications may be introduced into the preferred embodiment just set forth, which are comprised within the scope defined by the following claims.

The invention claimed is:

1. A computer-aided method suitable for assisting in the design of an aircraft by providing dimensioning aerodynamic forces, skin values or values distributions around an airfoil corresponding to an aircraft component in transonic conditions inside a predefined parameter space by means of a reconstruction of previously performed CFD computations for an initial group of points in the parameter space using a reduced-order model, generated by computing Proper Orthogonal Decomposition (POD) modes of flow variables and obtaining POD coefficients using a genetic algorithm (GA) that minimizes error associated to the reduced-order model, wherein said method comprises the following steps:

a) Decomposing for each flow variable the complete flow field (CFF) into a smooth field (SF) and a shock wave field (SWF) in each of said computations for an initial group of points obtained by said previously performed CFD computations;

b) Obtaining the POD modes associated with the smooth field (SF) and the shock wave field (SWF) for all said computations by the following sub-steps:

b1) Obtaining the internal shape of the shock wave by POD methodology;

b2) Dividing the smooth field (SF) into two regions, pressure region and a suction region;

b3) Selecting a set of computations to calculate POD modes of the smooth field (SF);

b4) Obtaining the smooth field (SF) and the complete flow field (CFF) by POD methodology;

b5) Obtaining an initial guess of POD mode amplitudes;

c) Obtaining the POD coefficients using a genetic algorithm (GA) that minimizes a fitness function defined using a residual calculated from Euler equations and boundary conditions of the previously performed CFD calculations;

d) Calculating said aerodynamic forces, skin values or values distribution for a combination of values of said parameters using the previous steps.

2. A computer-aided method suitable for assisting in the design of an aircraft as claimed in claim 1 wherein step (a) is performed using the following sub steps a1) obtaining the position and trace of the shock wave for each of said compilations a2) obtaining the smooth field (SF) and the shock wave field (SFW) for each of said computations;

a3) obtaining the internal shape and jump of the shock wave for each of said computations and for each of said flow variables.

3. A computer-aided method suitable for assisting in the design of an aircraft as claimed in claim 1 wherein step c) comprises iterating the following sub-steps c1) GA minimization of a residual to calculate the POD mode amplitudes of the smooth field (SF);

c2) GA minimization of a residual to obtain the position, the trace, and the internal structure of the shock wave iterating the step until a required accuracy is obtained.

4. The computer-aided method according to claim 1, wherein said predefined parameter space includes one or more of the following parameters: angle of attack, Mach number, sideslip angle, wing aileron deflection angle, spoilers deflection, high lift devices deflection, canard deflection, landing gear deflected status, landing gear doors angle, APU inlet open angle, the vertical tailplane rudder deflection angle, the horizontal tailplane elevator angle, the horizontal tailplane setting angle.

5. The computer-aided method according to claim 1, wherein said values distribution is one or a combination of the following: the pressure distribution, the velocity components distribution, the mach number (euler computation) distribution, the friction components distribution, the temperature distribution, the density distribution, the energy distribution, the entropy distribution, the enthalpy distribution.

6. The computer-aided method according to claim 1, wherein said aerodynamic forces include one or more of the following: the lift force, the drag force, the lateral force, the pitching moment, the rolling moment and the yawing moment of the aircraft component being designed.

7. The computer-aided method according to claim 1, wherein said aircraft component is one of the following: a wing, an horizontal tailplane, a vertical tailplane, fuselage, a high lift device, a spoiler, an engine, a canard.

8. A system comprising a computer memory and processor for assisting in the design of an aircraft by providing the dimensioning aerodynamic forces, skin values or values distribution around an airfoil corresponding to an aircraft component in transonic conditions inside a predefined parameter space, said computer memory having stored thereon modules comprising:

a) A computer-implemented discrete model of said aircraft component and the surrounding flow field;

b) A computer-implemented CFD module for calculating and storing fluid dynamic forces, skin values or values distribution for an initial group of points in the parameter space using a Navier-Stokes based model;

c) A computer-implemented Proper Orthogonal Decomposition (POD) reduced order model module for performing calculations of said aerodynamic forces, skin values or values distribution for any point in the parameter space, wherein, d) said computer-implemented CFD module comprises suitable means for decomposing for each flow variable the complete flow field (CFF) into a smooth field (SF) and a smooth shock wave field (SWF);

e) said computer-implemented POD reduced order-model comprises means for obtaining POD modes associated with the smooth field (SF) and shock wave field (SWF) considering a selected group of CFD computations and for obtaining POD coefficients using a genetic algorithm (GA) that minimizes a fitness function defined using a residual calculated from the Euler equations and boundary conditions, said computer implemented models being executable by said processor and wherein said computations include the following steps:

A) Decomposing for each flow variable the complete flow field (CFF) into a smooth field (SF) and a shock wave field (SWF) in each of said computations for an initial group of points obtained by said previously performed CFD computations;

B) Obtaining the POD modes associated with the smooth field (SF) and the shock wave field (SWF) for all said computations by the following sub-steps:

B1) Obtaining the internal shape of the shock wave by POD methodology;

B2) Dividing the smooth field (SF) into two regions, pressure region and a suction region;

B3) Selecting a set of computations to calculate POD modes of the smooth field (SF);

B4) Obtaining the smooth field (SF) and the complete flow field (CFF) by POD methodology;

B5) Obtaining an initial guess of POD mode amplitudes;

C) Obtaining the POD coefficients using a genetic algorithm (GA) that minimizes a fitness function defined using a residual calculated from Euler equations and boundary conditions of the previously performed CFD calculations;

D) Calculating said aerodynamic forces, skin values or values distribution for a combination of values of said parameters using the previous steps.

9. The computer-aided method according to claim 3, wherein said predefined parameter space includes one or more of the following parameters: angle of attack, Mach number, sideslip angle, wing aileron deflection angle, spoilers deflection, high lift devices deflection, canard deflection, landing gear deflected status, landing gear doors angle, APU inlet open angle, the vertical tailplane rudder deflection angle, the horizontal tailplane elevator angle, the horizontal tailplane setting angle.

10. The computer-aided method according to claim 3, wherein said values distribution is one or a combination of the following: the pressure distribution, the velocity components distribution, the mach number (euler computation) distribution, the friction components distribution, the temperature distribution, the density distribution, the energy distribution, the entropy distribution, the enthalpy distribution.

11. The computer-aided method according to claim 3, wherein said aerodynamic forces include one or more of the following: the lift force, the drag force, the lateral force, the pitching moment, the rolling moment and the yawing moment of the aircraft component being designed.

12. The computer-aided method according to claim 3, wherein said aircraft component is one of the following: a wing, an horizontal tailplane, a vertical tailplane, fuselage, a high lift device, a spoiler, an engine, a canard.

13. A computer-aided method suitable for assisting in the design of an aircraft by providing dimensioning aerodynamic forces, skin values or values distributions around an airfoil corresponding to an aircraft component in transonic conditions inside a predefined parameter space by means of a reconstruction of previously performed CFD computations using a Navier-Stokes model for an initial group of points in the parameter space using a reduced-order model, generated by computing Proper Orthogonal Decomposition (POD) modes of flow variables and obtaining POD coefficients using a genetic algorithm (GA) that minimizes error associated to the reduced-order model, wherein said method comprises the following steps:
 a) Decomposing for each flow variable the complete flow field (CFF) into a smooth field (SF) and a smooth shock wave field (SWF) in each of said computations for an initial group of points obtained by said previously performed CFD computations;
 b) Obtaining the POD modes associated with the smooth field (SF) and the shock wave field (SWF) for all said computations by the following sub-steps:
  b1) Obtaining the internal shape of the shock wave by POD methodology;
  b2) Dividing the smooth field (SF) into two regions, pressure region and a suction region;
  b3) Selecting a set of computations to calculate POD modes of the smooth field (SF);
  b4) Obtaining the smooth field (SF) and the complete flow field (CFF) by POD methodology;
  b5) Obtaining an initial guess of POD mode amplitudes;
 c) Obtaining the POD coefficients using a genetic algorithm (GA) that minimizes a fitness function defined using a residual calculated from Euler equations and boundary conditions of the previously performed CFD calculations;
 d) Calculating said aerodynamic forces, skin values or values distribution for a combination of values of said parameters using the previous steps.

14. A computer-aided method suitable for assisting in the design of an aircraft as claimed in claim 1 wherein the previously performed CFD computations use a Navier-Stokes based model.

15. A computer-aided method suitable for assisting in the design of an aircraft as claimed in claim 13 wherein the previously performed CFD computations use a Navier-Stokes based model.

* * * * *